United States Patent
Rüttiger et al.

(10) Patent No.: US 7,331,531 B2
(45) Date of Patent: Feb. 19, 2008

(54) CONDENSATION SENSOR

(75) Inventors: Anton Rüttiger, Wildflecken (DE); Jürgen Nauth, Burkardroth (DE)

(73) Assignee: Preh GmbH, Bad Neustadt/Saale (DE)

( * ) Notice: Subject to any disclaimer, the term of this patent is extended or adjusted under 35 U.S.C. 154(b) by 64 days.

(21) Appl. No.: 11/373,249

(22) Filed: Mar. 13, 2006

(65) Prior Publication Data

US 2006/0202044 A1 Sep. 14, 2006

Related U.S. Application Data

(63) Continuation of application No. PCT/EP2004/009990, filed on Sep. 8, 2004.

(30) Foreign Application Priority Data

Sep. 11, 2003 (DE) ................................ 103 42 327

(51) Int. Cl.
*G01N 7/00* (2006.01)
*F24F 3/14* (2006.01)
*H05B 1/02* (2006.01)

(52) U.S. Cl. ..................... 236/44 C; 62/150; 73/29.01; 73/335.05

(58) Field of Classification Search ............... 73/29.01, 73/29.04, 29.05, 335.02, 335.03, 335.04, 73/335.05, 335.07; 62/150, 176.1, 176.2; 236/44 C; 324/689; 374/27, 28, 16, 21, 374/142, 183

See application file for complete search history.

(56) References Cited

U.S. PATENT DOCUMENTS

| | | | |
|---|---|---|---|
| 3,831,450 A | * | 8/1974 | Schipke et al. ............. 374/102 |
| 3,934,111 A | | 1/1976 | Roselli et al. |
| 4,378,168 A | | 3/1983 | Kuisma et al. |
| 4,503,707 A | * | 3/1985 | Rosa et al. .................. 374/142 |
| 4,801,211 A | | 1/1989 | Yagi et al. |
| 4,816,748 A | | 3/1989 | Tazawa et al. |
| 5,365,784 A | | 11/1994 | Morrissey |
| 5,568,977 A | | 10/1996 | Gschwind et al. |
| 5,739,416 A | | 4/1998 | Hoenk |
| 5,801,307 A | | 9/1998 | Netzer |
| 6,422,062 B1 | * | 7/2002 | King et al. ................. 73/29.01 |

(Continued)

FOREIGN PATENT DOCUMENTS

DE 197 22 577 A 12/1998

(Continued)

OTHER PUBLICATIONS

"Feuchtesensor für Klimaautomaten," Automobile Technical Magazine 102 (2000) 1, pp. 42-44.

Primary Examiner—Chen Wen Jiang
(74) Attorney, Agent, or Firm—Geissler, Olds & Lowe, PLLC

(57) ABSTRACT

A measuring device for detecting a humidity and temperature of a surface of a glass pane facing an interior of a vehicle. The measuring device includes at least one humidity sensor and at least one temperature sensor jointly arranged on the surface of the glass pane, an evaluation unit connected downstream of the humidity and temperature sensors, and a signal conversion and linking unit arranged between the humidity and temperature sensors and the evaluation unit. Further, the converting and linking unit generates a rectangular wave-shaped signal having at least two different impulse lengths, each impulse length being a measure of a detected humidity and temperature.

22 Claims, 2 Drawing Sheets

U.S. PATENT DOCUMENTS

| | | |
|---|---|---|
| 6,809,530 B2 | 10/2004 | Schmitt et al. |
| 6,980,092 B2 | 12/2005 | Turnbull et al. |
| 2002/0032510 A1* | 3/2002 | Turnbull et al. .............. 701/49 |
| 2003/0086475 A1 | 5/2003 | Polzer et al. |
| 2005/0028588 A1 | 2/2005 | Mitter |
| 2005/0115308 A1 | 6/2005 | Koram et al. |
| 2006/0203879 A1* | 9/2006 | Ruttiger et al. ............. 374/142 |

FOREIGN PATENT DOCUMENTS

| | | |
|---|---|---|
| DE | 199 07 401 A | 8/2000 |
| DE | 19942286 | 8/2000 |
| DE | 101 52 999 | 5/2003 |
| EP | 950587 | 10/1999 |
| FR | 2264957 | 12/1975 |
| JP | 54115834 | 9/1979 |
| JP | 62203855 | 9/1987 |
| JP | 02120156 | 5/1990 |

* cited by examiner

CONDENSATION SENSOR

This nonprovisional application is a continuation application of PCT/EP2004/009990, which was filed on Sep. 8, 2004, and which claims priority to German Patent Application No. DE 103 42 327.3, which was filed in Germany on Sep. 11, 2003, and which are both herein incorporated by reference.

BACKGROUND OF THE INVENTION

1. Field of the Invention

The present invention relates to a measuring device for detecting a humidity and temperature of a surface of a glass pane facing an interior of a vehicle such as a windshield of a motor vehicle. The measuring device includes at least one humidity sensor and at least one temperature sensor arranged on the surface of the glass pane, and an evaluation unit connected downstream thereof. Also included is a conversion module that converts measured temperature and humidity signals into a single rectangular-wave pulse signal that is applied to the evaluation unit.

2. Description of the Background Art

Heating and air-conditioning systems provide a high level of interior comfort to passengers in a motor vehicle. Further, during the automatic operation of an air-conditioning system, various exterior conditions can lead to window condensation. For example, window condensation can occur during an extended recirculation operation, at low or fast-dropping exterior temperatures, or when not enough fresh air is being supplied to the inside of the automobile. In these instances, the relative air humidity inside the vehicle rapidly rises, which is also contributed to by the passengers of the vehicle.

Thus, sensor systems are used to detect window condensation. For example, the German application No. DE 199 07 401 illustrates a system for detecting window condensation whereby the relative humidity is measured and transmitted to a control device of the air-conditioning system. That is, a moisture-sensitive sensor is glued to the interior side of the windshield to thereby detect window condensation. In addition, at the onset of window condensation, even before the condensation becomes visible, a capacitance of the electrical sensor abruptly changes and the abrupt change is evaluated and transmitted to a control device of the air-conditioning system to initiate suitable measures such as introducing fresh air to prevent fogging or condensation on the windshield.

Further, the article in the magazine Automobile Technical Magazine 102 (2000) 1, at pages 42-44, illustrates a sensor used to determine if condensation is potentially forming on the windshield. In this article, the sensor detects the relative humidity using a capacitive thin-film sensor, and measures the temperature of the windowpane surface at the same time. In addition, the sensor is a highly sensitive infrared radiation detector based on thin-film thermal elements, which allows for a touch-free measurement of the temperature. The evaluating unit then calculates the dew point temperature after converting analog input signals of the relative air humidity and the corresponding temperature, and uses the calculated dew point to determine the possibility of condensation forming on the windshield. The sensors are also mounted to the rear side of the interior mirror at a distance from the windshield.

In addition, German Application No. DE 101 52 999 illustrates a sensor for detecting a propensity of condensation forming on a windshield. In this application, a sensor module is arranged directly on the windowpane and is used to measure the moisture on the window as well as the temperature of the window surface. The measured signals are then transmitted to an evaluation unit, which calculates a propensity for condensation forming on the windshield.

SUMMARY OF THE INVENTION

It is therefore an object of the present invention to provide a measuring device that is a simple, cost-effective sensor module, and which transmits several sets of data concerning a condensation state of a window surface via only one signal line.

Another object of the present invention is to provide a method for detecting a plurality of data corresponding to a condensation state of a window surface and transmitting the plurality of data to an evaluation unit via only one signal line.

To achieve these and other objects, the present invention provides a signal converting and linking unit arranged between a plurality of measuring sensors and an evaluation unit. Further, the signal converting and linking unit combines a plurality of measured signals from the sensors into a single signal and forwards the signal to the evaluation unit. Thus, by inserting the signal converting and linking unit between the sensors and the evaluation unit according to the present invention, it is possible to provide separate measuring signals via one signal line.

Further, the measuring values of the sensors are generally analog signals and thus serve as a measure of the current conditions on the window surface. In one embodiment of the present invention, the temperature sensor is a resistor and the moisture sensor is a capacitor, and the two sensors are arranged directly on the window surface. That is, the two sensors are glued to the window surface via a heat-conducting foil provided with an adhesive coat.

Preferably, a thermistor such as a Negative Temperature Coefficient (NTC) resistor is used for measuring the temperature, and a condenser is used to measure the moisture. That is, the condenser includes an intermediate moisture-sensitive layer, whereby the dielectric constant changes depending on the amount of moisture absorbed by the moisture-sensitive layer, thus adjusting the capacitances in the condenser.

Further, in accordance with one embodiment of the present invention, a first oscillator is connected downstream from the moisture sensor and a second oscillator is connected downstream from the temperature sensor. In addition, the first oscillator generates a first frequency representing a measure of the temperature and the second oscillator generates a second frequency representing a measure of the condensation on the window surface. The two oscillator frequencies are then combined in the converting and linking unit into a rectangular-wave signal. In addition, each pulse length of the rectangular-wave signal represents either the measured temperature or moisture. This generated rectangular-wave signal is then transmitted to the evaluation unit, which can be a processor for an air-conditioning system, for example.

In addition, the first and second frequencies generated in the oscillators occupy different frequency ranges, and thus it is easy to differentiate in the evaluation unit between the different frequencies and/or the generated impulse lengths. Further, by inserting the signal converting and linking unit between the sensors and the evaluation unit, the present invention is able to advantageously provide one signal line between the sensor module and the evaluation unit. The sensor module includes the sensors, the oscillators and the converting and linking unit.

The present invention also provides a method in which the detected measuring signal of each sensor is transmitted to the respective oscillator, and the two signals generated by the oscillators are converted and linked into a rectangular wave form composite signal that is forwarded to an evaluation unit. According to this method, analog signals of the two sensors are alternately absorbed via the oscillators, and combined into a rectangular wave form. Thus, only one signal line is needed to transmit the combined signal to the evaluation unit. That is, only one signal line has to be installed from the sensor module arranged directly on the window pane to the evaluation unit.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
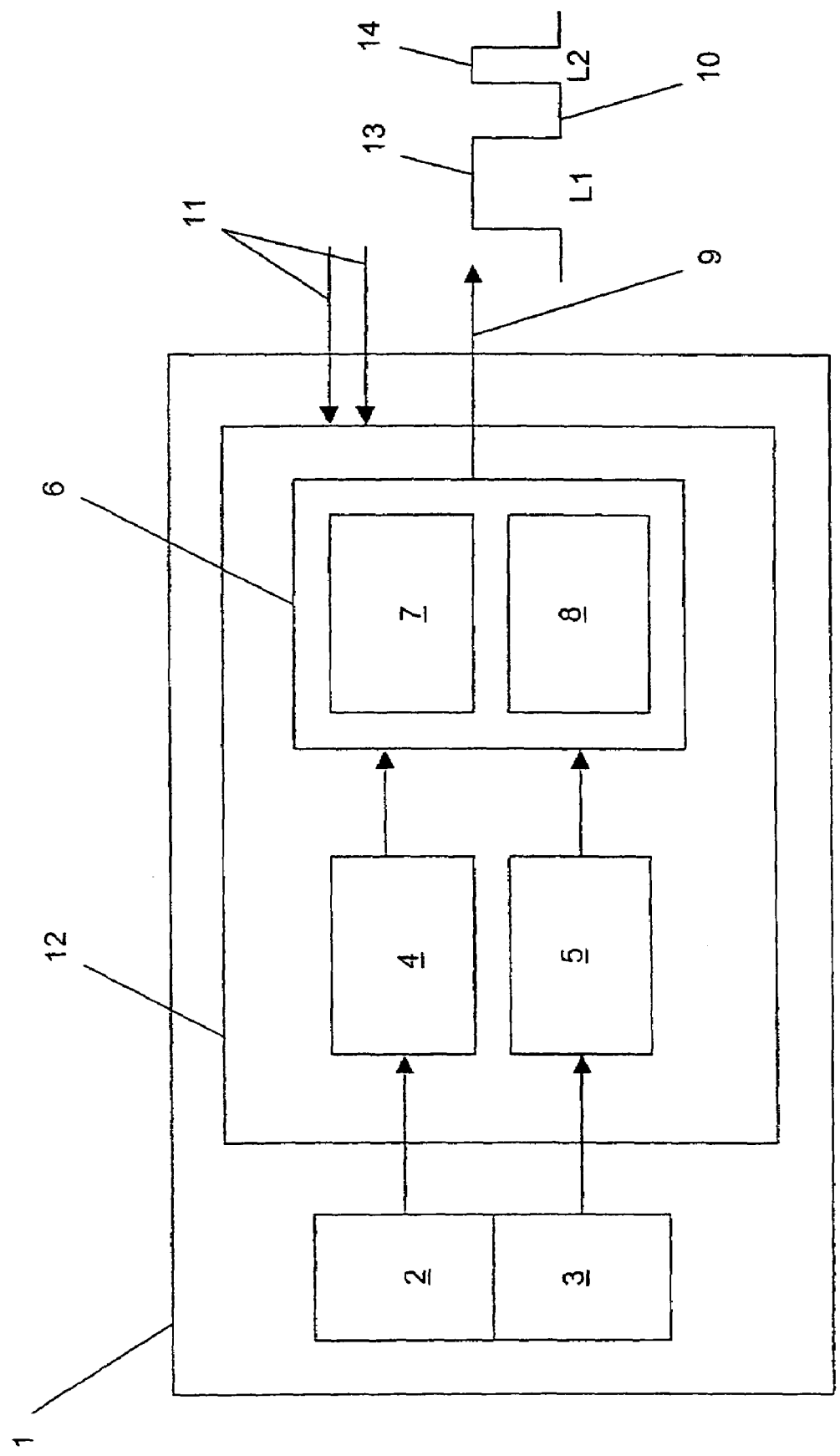
FIG. 1 is a block diagram of a sensor module in accordance with one embodiment of the present invention.
Figure 2:
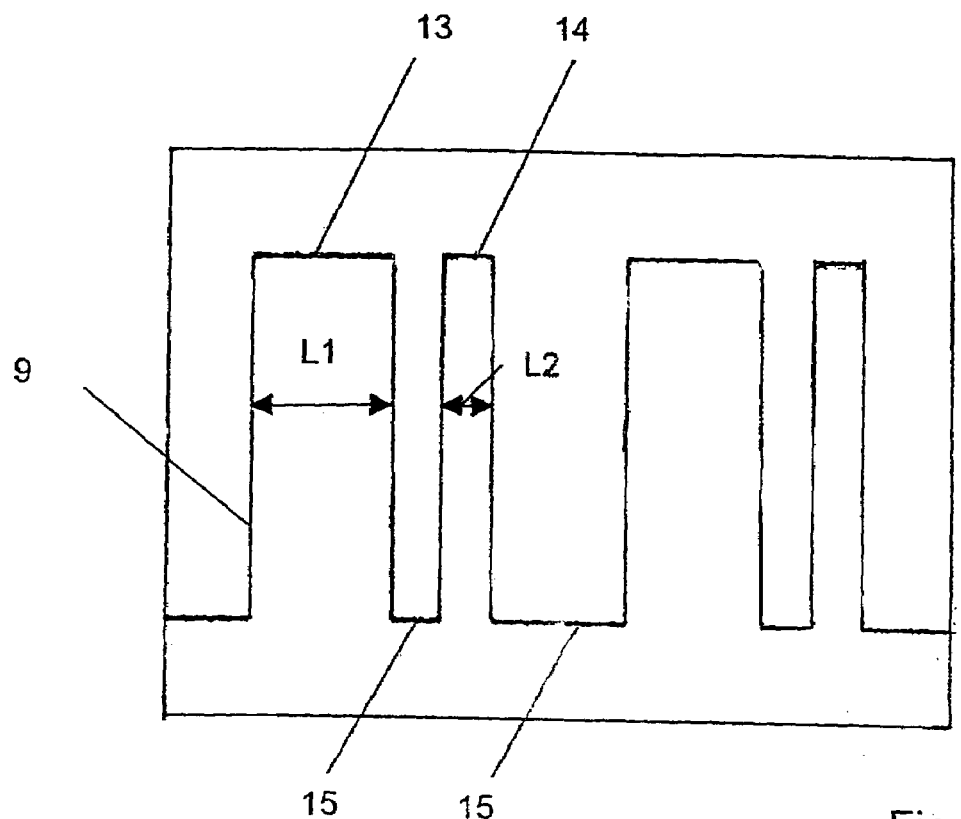
FIG. 2 is a graph illustrating a combined output signal including values representing a measured temperature and moisture of a glass panel.
Figure 3:
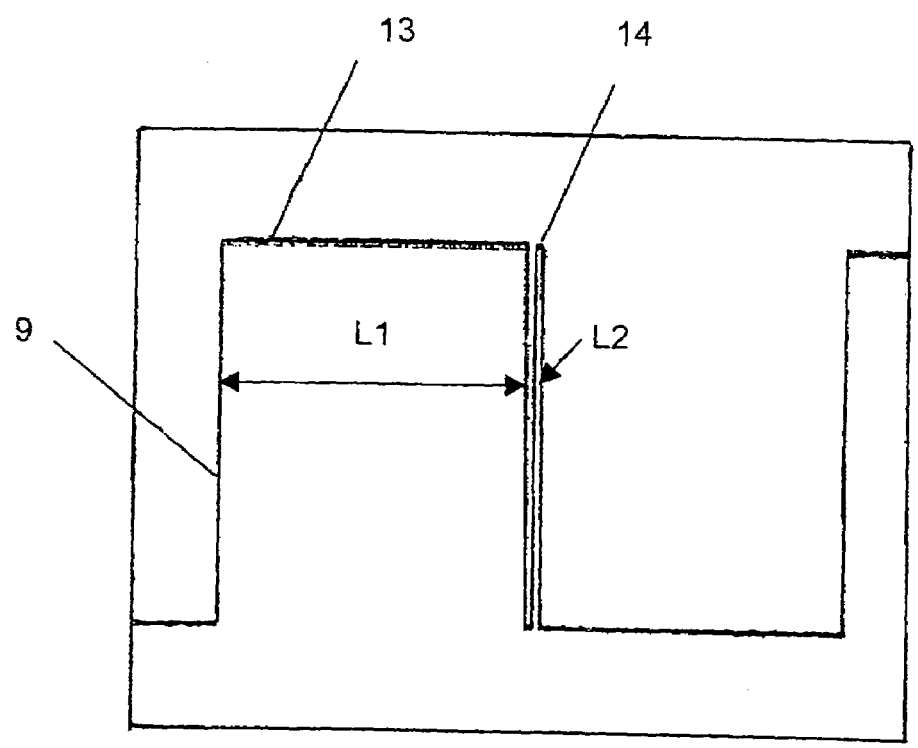
FIG. 3 is a graph illustrating the combined signal when the capacitance element is shorted.

The present invention will now be described with respect to FIGS. 1-3. In more detail, FIG. 1 is a block diagram illustrating a sensor module 1 for measuring a humidity and temperature of a window surface such as a windshield in an automobile. As shown, the sensor module 1 includes a capacitive sensor or condenser 2 for measuring an absolute moisture on the window surface and a resistor 3 for measuring a temperature of the window surface.

The resistor 3 is preferably a thermistor, and more preferably an NTC resistor. In addition, the condenser 2 and the resistor 3 are directly attached to the windshield via a heat-conducting foil. Further, in one embodiment of the present invention, the sensor module 1 is formed as a single unit and is directly affixed to the window surface via the heat-conduction foil. Alternatively, the sensor module 1 can also be integrated in a rear-view mirror arranged on the windshield.

Further, as shown in FIG. 1, the sensor module 1 also includes oscillators 4 and 5 respectively connected to the condenser 2 and resistor 3. The oscillator 4 generates a signal indicating a capacity of the corresponding condenser 2. That is, the oscillator 4 provides a special frequency for each measured value of the condenser 2. Similarly, the oscillator 5 generates a frequency indicating the measured temperature of the window surface.

Thus, from the absolute measured values of the temperature and moisture, the relative moisture can be determined in the evaluation unit. Furthermore, because the two sensors 2, 3 work independently from one another, the present invention is advantageously able to set the so-called wellness controls inside the vehicle. That is, different adjustments for humidity and temperature inside the vehicle can be made according to personal preferences and based on the separately measured temperature and moisture values. The present invention is also able to control or prevent window condensation by controlling the humidity, for example, inside of the vehicle. In addition, the sensor module 1 detects that condensation is likely to occur before it becomes visible, thus preventing condensation on the surface of the pane.

In addition, FIG. 1 also illustrates a converting and linking unit 6 arranged downstream from the oscillators 4 and 5. The two signals from the oscillators 4, 5, are linked and converted into one combined signal in the converting and linking unit. Therefore, only a single line is required between the converting and linking unit 6 and the evaluation unit. In more detail, the converting and linking unit 6 includes a changeover logic unit 7 and a frequency divider 8, which are used to provide an output signal 9 having a rectangular wave form 10. The rectangular wave 10 alternatingly provides a signal corresponding the measured temperature and moisture on the window surface.

Further, as shown in FIG. 1, the supply voltage for the sensor module 1 is illustrated by arrows 11. The arrows 11 point to a printed circuit board 12 on which the oscillators 4 and 5 and the converting and linking unit 6 are mounted. In addition, as discussed above, the sensors 2 and 3 may be directly arranged on the window surface for detecting the measuring signals or may be mounted on a rear view mirror. Further, as shown in FIG. 1, the sensors 2 and 3 are connected to the printed circuit board 12.

In addition, as shown at the right side of FIG. 1, the rectangular wave 10 includes a first impulse 13 and a second impulse 14. The first impulse 13 corresponds to the measured temperature of the resistor 3 and has a pulse length L1 indicating a value of the measured temperature. That is, the pulse length L1 is directly proportional to the measured temperature of the window surface.

Further, the second impulse 14 corresponds to the measured moisture and has a pulse length L2 indicating a value of the measured moisture. That is, the pulse length L2 is directly proportional to the measured moisture of the window surface. In more detail, the capacitance of the sensor 2 changes with an increase in the moisture on the window surface, and this change is reflected in the pulse length L2. Further, because the frequencies generated in the oscillators 4 and 5 are at a sufficient distance from one another, the evaluation unit can advantageously determine the measured temperature and moisture values from the combined signal 9.

In addition, when the sensor module 1 is used in motor vehicles, the temperature range to be covered is approximately between −40° C. and 105° C. Thus, in one example, a minimum frequency of 8 Hz corresponding to a measured temperature of −40° C., and a maximum frequency of about 80 Hz corresponding to a measured temperature of 105° C. can be generated in the oscillator 5 to represent these upper and lower category temperatures. Likewise, at a relative humidity of about 0% and a temperature of −40° C., a maximum frequency of about 160 Hz can be set in the oscillator 4, and at a relative humidity of about 100% and a temperature of 105° C., a minimum frequency of approximately 102 Hz can be set in the oscillator 4.

Because the frequency ranges are at a sufficient distinct distance from one another, the evaluation unit can clearly identify the output signal, that is, the impulse lengths generated relative to the frequency. In FIG. 2, the output signal 9 is illustrated in a graph. As shown, the first impulse 13 has an impulse length L1 and is a measure of the frequency of oscillator 5, and the second impulse 14 has an impulse length L2 and is a measure of the frequency generated in oscillator 4. FIG. 2 also shows the output signal 9 at room temperature and at average humidity. Further, the positive impulses 13, 14 are preceded by respective negative impulses 15, which indicate the auxiliary phases of the oscillators 4, 5.

Thus, based on the respective impulse lengths, the evaluation unit can determine the temperature or moisture of the glass surface. Furthermore, the sensor module 1 of the present invention can also advantageously determine if a short circuit or a disruption of the sensors 2, 3 has occurred. In more detail, when a short circuit or malfunction of the sensors 2, 3 occurs, the respective oscillators 4,5 generate a frequency outside the measuring range. Thus, it is possible to detect if a wiring path was disrupted or the humidity sensor 2 was short-circuited by a drop of water, for example. For example, FIG. 3 illustrates a behavior of the output signal 9 when a short circuit occurs in the temperature sensor 3 and the humidity sensor 2. As shown, the signals deviate from the frequencies in the usual measuring range, and can thus be used to diagnose a short circuit or other problem with one of the sensors 2, 3.

In addition, in one embodiment of the present invention, the two sensors 2, 3 are arranged directly adjacent to one another and are glued to the window. In addition, the sensors 2, 3 are activated or evaluated alternately, i.e., one sensor is activated and then the other sensor is activated. Thus, the sensors 2,3 are prevented from interfering with each other caused by the sensor emitting heat thereby affecting the other sensor. That is, even minimal warming of the sensors during an measurement period can negatively affect the other sensor. Thus, the present invention advantageously alternates activating or evaluating each sensor 2, 3.

Further, the present invention also provides an interface (not shown) for a bus system on the printed circuit board 12, and which is located behind the circuit module 6. The interface is used to transmit the data from the sensors in coded form in a local vehicle network, but still via one signal line. In addition, the above-description refers to a rectangular-shaped signal. However, other types of signals such as a triangular or square-shaped signal may also be used.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring device for detecting a humidity and temperature of a surface of a glass pane facing an interior of a vehicle, comprising:
   at least one humidity sensor and at least one temperature sensor jointly arranged on the surface of the glass pane;
   an evaluation unit connected downstream of the humidity and temperature sensors; and
   a signal converting and linking unit arranged between the humidity and temperature sensors and the evaluation unit.

2. The measuring device according to claim 1, wherein the evaluation unit evaluates the humidity and temperature sensors in successive turns.

3. The measuring device according to claim 1, further comprising:
   an oscillator connected downstream of each sensor,
   wherein the signal and converting unit includes a frequency divider and a changeover logic unit.

4. The measuring device according to claim 3, wherein the converting and linking unit generates a rectangular wave-shaped signal having at least two different impulse lengths, each impulse length being a measure of a detected humidity and temperature in the humidity and temperature sensors.

5. The measuring device according to claim 3, wherein the oscillators, the changeover logic unit, and the frequency divider are arranged on a mutual printed circuit board.

6. The measuring device according to claim 5, further comprising an interface for a bus system arranged on the printed circuit board.

7. The measuring device according to claim 1, wherein the temperature sensor comprises a resistor equipped with a negative temperature coefficient.

8. The measuring device according to claim 1, wherein the humidity sensor comprises a condenser having a moisture-sensitive intermediate layer.

9. The measuring device according to claim 1, wherein the glass pane comprises a windshield of a motor vehicle.

10. A measuring device according to claim 1, wherein the converting and linking is configured to combine first and second signals from the at least one humidity sensor and the at least one temperature sensor into a composite signal having a rectangular wave form.

11. A method for detecting a measuring signal to determine a temperature and humidity of a surface of a glass pane facing a passenger compartment, said method comprising:
   detecting the humidity of the surface of the glass pane using a humidity sensor;
   detecting the temperature of the surface of the glass pane using a temperature sensor;
   generating first and second signals respectively corresponding to the detected humidity and temperature using oscillators arranged downstream of the humidity and temperature sensors; and
   converting and linking the first and second signals into a composite signal having a rectangular wave form.

12. The method according to claim 11, wherein temperature is detected by a negative coefficient temperature resistor.

13. The method according to claim 11, wherein a change in the temperature or the moisture on the surface of the pane generates an altered resistance value and an altered capacitance value, respectively, which is detected by the humidity and temperature sensors, and that as a consequence of the altered detected values, the generating step generates different frequencies represent the altered changes, and the converting and linking step generates an altered rectangular wave-shaped signal.

14. The method according to claim 11, wherein the glass pane comprises a windshield of a motor vehicle.

15. A measuring device, comprising:
   at least one humidity sensor configured to detect a humidity of a surface of a glass panel and to output a corresponding humidity measuring signal;
   at least one temperature sensor configured to detect a temperature of the surface of the glass pane and to output a corresponding temperature measuring signal;
   a combination unit configured to combine the humidity and temperature measuring signals into a combined signal; and
   an evaluation unit configured to evaluate the combined signal to determine a current temperature and humidity of the surface of the glass pane.

16. The measuring device according to claim 15, wherein the humidity and temperature sensors are affixed to the glass pane next to each other.

17. The measuring device according to claim 15, further comprising:
- a first oscillator connected to the humidity sensor and configured to generate a first frequency indicative of the detected humidity; and
- a second oscillator connected to the temperature sensor and configured to generate a second frequency indicative of a detected temperature.

18. The measuring device according to claim 17, wherein the first and second oscillators and the combination unit are arranged on a printed circuit board separate from the humidity and temperature sensors.

19. The measuring device according to claim 15, wherein the combination unit includes a frequency divider and a changeover logic unit to thereby produce a rectangular wave-shaped combined signal having pulse lengths indica tive of the detected humidity and temperature on the glass pane.

20. The measuring device according to claim 15, wherein the temperature sensor comprises a resistor equipped with a negative temperature coefficient, and the humidity sensor comprises a condenser having a moisture-sensitive intermediate layer.

21. The measuring device according to claim 15, wherein the combination unit generates a rectangular wave-shaped signal having at least two different impulse lengths, each impulse length being a measure of the detected humidity and temperature, respectively.

22. The measuring device according to claim 15, wherein the glass pane comprises a windshield of a motor vehicle.

* * * * *